Sept. 14, 1937.  G. N. OGLOBLINSKY  2,093,288
TELEVISION APPARATUS
Filed April 29, 1933
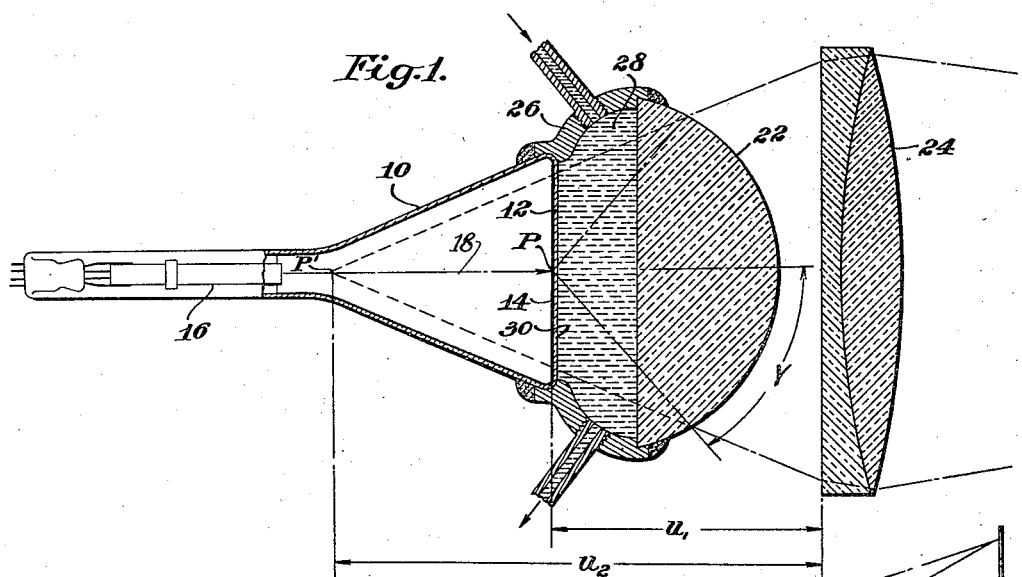
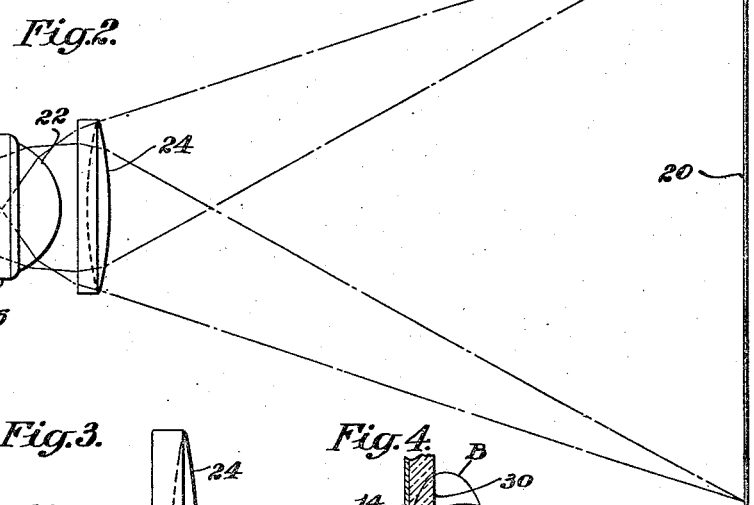
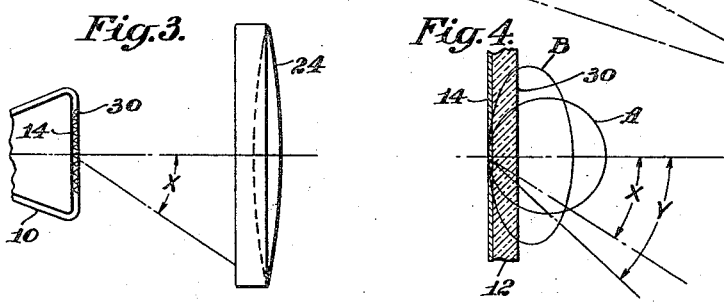
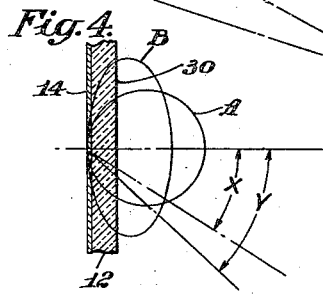
INVENTOR:
Gregory N. Ogloblinsky,
BY Goldsborough
HIS ATTORNEY.

Patented Sept. 14, 1937

2,093,288

UNITED STATES PATENT OFFICE 2,093,288

TELEVISION APPARATUS

Gregory N. Ogloblinsky, Collingswood, N. J., assignor to Radio Corporation of America, New York, N. Y., a corporation of Delaware Application April 29, 1933, Serial No. 668,483

6 Claims. (Cl. 250—27.5)

My invention relates to improvements in television systems.

In one form of television receiving apparatus, the picture is reproduced by a small cathode ray tube having a flat end on the inner face of which is a fluorescent screen. In operation, the cathode ray is made to scan this screen and, simultaneously, the intensity of the ray is modulated by the received picture signals. The picture reproduced is very small but since it is intensely bright, it may be projected onto a suitable screen by an optical system. In these projection systems, a very substantial amount of light is lost. This loss has been in part attributed to total internal reflection of the light at the external surface of the glass forming the flat end of the cathode ray tube. Also, it has been attributed to the limited value of the angle embracing the light which is actually effective.

With the foregoing in mind, it is one of the objects of my invention to provide improved apparatus of the character referred to wherein there is much less loss of light than has been the case in similar apparatus proposed heretofore.

Other objects and advantages will hereinafter appear.

For the purpose of illustrating my invention, an embodiment thereof is shown in the drawing, wherein Figure 1 is a central sectional view of television receiving apparatus constructed in accordance with my invention;

Fig. 2 is a view similar to Fig. 1, but on a smaller scale, and

Figs. 3 and 4 are fragmentary views, partly diagrammatic, illustrative of the principle of operation.

With reference to Fig. 1, 10 designates a cathode ray tube of pyrex or equivalent material, and having a flat end 12 on the inner face of which is a fluorescent screen 14. In operation, a suitable form of electron gun 16 operates to develop a ray 18 of electrons, and to direct the ray at the screen 14. The ray is caused to scan the screen 14 by impressing electrical waves across deflecting coils or plates (not shown).

As the ray scans the screen 14, the intensity thereof is modulated in accordance with the received picture signals to develop an extremely bright image. This image is projected onto a screen 20 by a semi-spherical lens 22 and a suitable lens 24. Supported by a collar 26 is a lens 22 which has its flat face parallel to the wall structure 12. The collar 26 is substituted on the tube envelope 10 surrounding the wall structure 12. As it is shown, the location of the lens 22 is such as to fulfill the aplanatic conditions.

$$\frac{1}{u_1}+\frac{1}{u_2}=\frac{1}{r}$$

where $u_1$ the distance from the aplanatic point P to the lens 24, $u_2$ is the distance of the virtual image $P_1$ to the lens 24, and $r$ is the radius of the curvature of the lens. The lens 22, the collar 26 and the wall structure 12 form a fluid chamber which is filled with oil or any other suitable liquid 28 having an index of refraction equal to the index of pyrex glass. It is desirable that the glass of which the lens 22 is made shall also have an index of refraction substantially equal to the index of pyrex glass.

The presence of the oil 28 removes the first cause of light loss, namely, the total internal reflection at the external surface 30 of the end wall, as represented in Fig. 3.

The location of the point source P at the aplanatic point gives a virtual image of P and P' free from spherical aberration on the axis. This, also, insures an extremely wide aperture, as illustrated by the relatively large angle Y. In systems proposed heretofore, this angle has been much smaller, as represented in Fig. 4 by the angle X. The advantage of the larger angle Y resides in the fact that the space distribution of light emitted by the fluorescent material 14 does not follow the simple Lambert's cosine law as per curve A, but is somewhat flatter, as illustrated by curve B. The losses of light due to the second effect referred to are, therefore, substantially decreased by increasing the value of the angle from X to Y.

The lens 24 can be a simple lens or any other more elaborate projection system. Since the virtual image P' lies farther away from this lens than the image source P, it is working at a relatively small opening.

If desired, suitable coloring agents can be added to the oil 28 for the purpose of eliminating undesirable components of light emitted from the fluorescent screen 14. In this connection, chromatic correction is not absolutely necessary with the present fluorescent materials whose main radiative energy lies in the green, violet and blue parts of the spectrum.

As illustrated in Fig. 1, the oil 28 may be made to circulate for the purpose of removing heat developed on the fluorescent screen 14.

I claim as my invention:

1. A cathode ray device comprising a tube having transparent and flat wall structure with a given index of refraction, fluorescent material disposed in the form of a layer on the inside surface of said wall structure, a substantially semi-spherical lens disposed in spaced relation with respect to said wall structure with its flat face parallel to the latter, and means connecting said lines and tube and providing a fluid container for filling the space between said wall structure and lens with a fluid having substantially said given index of refraction.

2. A cathode ray device comprising a tube having transparent and flat wall structure with a given index of refraction, fluorescent material disposed in the form of a layer on the inside surface of said wall structure, a substantially semi-spherical lens disposed in spaced relation with respect to said wall structure with its flat face parallel to the latter, and a collar on said tube and holding said lens in said relation and forming with said wall structure and lens a fluid chamber.

3. A cathode ray device comprising a tube having transparent and flat wall structure provided on the inner face thereof with a layer of fluorescent material, means for developing a ray of electrons and directing the same at said layer to create a point source of light in the nature of a fluorescent spot at the inner face of said wall structure, and a substantially semi-spherical lens disposed in spaced relation with respect to said wall structure with its flat face parallel to the latter and with said point source of light substantially at the aplanatic focus of said lens.

4. A cathode ray device comprising a tube having transparent and flat wall structure provided on the inner face thereof with a layer of fluorescent material, means for developing a ray of electrons and directing the same at said layer to create a point source of light in the nature of a fluorescent spot at the inner face of said wall structure, a substantially semi-spherical lens, and means supporting said lens with its flat face in spaced and parallel relation with respect to said wall structure and with said point source of light substantially at the aplanatic focus of said lens, said supporting means forming with said wall structure and said lens a chamber for a liquid.

5. A cathode ray device comprising a tube having a fluorescent screen supported on a transparent member and provided with means for developing a cathode ray and directing the ray at said screen, and a composite lens system comprising a spherical lens separated from the screen, and a liquid filling the space between said screen support and said spherical lens.

6. In combination, a cathode ray device, having a transparent support bearing fluorescent material thereon, means for reducing the loss of light from said fluorescent material comprising a semi-spherical lens in register with said transparent support, said lens having substantially the same index of refraction as said transparent support, means for supporting said lens at a distance from said transparent support, and means for filling the intervening space between said transparent support and said lens with a liquid whose index of refraction is substantiallly that of said transparent support.

GREGORY N. OGLOBLINSKY.